United States Patent
Tanazawa (10) Patent No.: US 9,244,234 B2
(45) Date of Patent: Jan. 26, 2016

(54) OPTICAL RECEPTACLE AND OPTICAL MODULE

(71) Applicant: Enplas Corporation, Saitama (JP)

(72) Inventor: Masahiro Tanazawa, Saitama (JP)

(73) Assignee: ENPLAS Corporation, Saitama (JP)

( * ) Notice: Subject to any disclaimer, the term of this patent is extended or adjusted under 35 U.S.C. 154(b) by 0 days.

(21) Appl. No.: 14/335,971

(22) Filed: Jul. 21, 2014

(65) Prior Publication Data

US 2015/0030285 A1    Jan. 29, 2015

(30) Foreign Application Priority Data

Jul. 23, 2013 (JP) .................................. 2013-152652

(51) Int. Cl.
G02B 6/42 (2006.01)
G02B 27/14 (2006.01)
G02B 27/10 (2006.01)

(52) U.S. Cl.
CPC ............ *G02B 6/4286* (2013.01); *G02B 6/4214* (2013.01); *G02B 27/143* (2013.01); *G02B 6/425* (2013.01); *G02B 6/428* (2013.01); *G02B 27/108* (2013.01)

(58) Field of Classification Search
None
See application file for complete search history.

(56) References Cited

U.S. PATENT DOCUMENTS

| 2002/0110171 | A1 | 8/2002 | Wickstrom et al. |
| 2006/0002651 | A1* | 1/2006 | Shimizu et al. ................. 385/14 |
| 2008/0142815 | A1 | 6/2008 | Morioka |
| 2011/0097037 | A1* | 4/2011 | Kuznia et al. ........ G02B 6/4214 385/33 |
| 2012/0193522 | A1* | 8/2012 | Yan et al. ................. 250/227.28 |
| 2012/0263416 | A1* | 10/2012 | Morioka ......................... 385/33 |
| 2014/0003768 | A1* | 1/2014 | Hung ............................. 385/33 |
| 2014/0029953 | A1* | 1/2014 | Otte et al. ..................... 398/139 |
| 2014/0079352 | A1* | 3/2014 | Lin ............................... 385/14 |
| 2014/0328558 | A1* | 11/2014 | Morioka et al. ................ 385/33 |
| 2014/0339403 | A1* | 11/2014 | Morioka ................. 250/227.11 |
| 2015/0010272 | A1* | 1/2015 | Tanazawa ....................... 385/31 |

FOREIGN PATENT DOCUMENTS

| JP | 2000-340877 A | 12/2000 |
| JP | 2004-221420 A | 8/2004 |
| JP | 2007-171427 A | * 7/2007 ............... G02B 6/42 |
| JP | 2008-151894 A | 7/2008 |

* cited by examiner

*Primary Examiner* — Mike Stahl
(74) *Attorney, Agent, or Firm* — Brundidge & Stanger, P.C.

(57) ABSTRACT

An optical receptacle includes a first optical surface which receives incidence of light, a reflecting surface which reflects light along a substrate, a light separating section which separates light from the reflecting surface into monitor light and signal light, a second optical surface which emits the monitor light toward a light receiving element, and a third optical surface which emits the signal light. The light separating section includes a plurality of separating units each including a vertical splitting transmissive surface, an inclining splitting reflecting surface and a parallel splitting stepped surface. In the light separating section, 4 to 6 separating units are disposed within a region where light reflected at the reflecting surface is incident. A height of a boundary between the splitting transmissive surface and the splitting stepped surface with respect to a virtual plane including the splitting reflecting surface is 13 to 21 μm.

12 Claims, 8 Drawing Sheets

OPTICAL RECEPTACLE AND OPTICAL MODULE

CROSS REFERENCE TO RELATED APPLICATIONS

This application is entitled and claims the benefit of Japanese Patent Application No. 2013-152652, filed on Jul. 23, 2013, the disclosure of which including the specification, drawings and abstract is incorporated herein by reference in its entirety.

TECHNICAL FIELD

The present invention relates to an optical receptacle and an optical module having the optical receptacle.

BACKGROUND ART

Optical modules equipped with light emitting elements such as surface emitting lasers (for example, VCSEL; Vertical Cavity Surface Emitting Laser) have been used in fiber-based optical communication. An optical module has an optical receptacle which allows light carrying communication information emitted from the light emitting element to be incident on an end face of an optical fiber.

Some optical modules are configured to monitor intensity and an amount of light emitted from a light emitting element for the purpose of stabilizing output characteristics of the light emitting element against temperature change and adjusting light output.

For example, PTL 1 and PTL 2 describe a package type optoelectric converting device which includes a light emitting element and a light receiving element for monitoring. In the package type optoelectric converting device, part of the light emitted from the light emitting element is reflected to a side of the light receiving element as monitor light by a glass window of the package. However, when the package type optoelectric converting device described in PTL 1 and PTL 2 is driven at a high frequency, a crosstalk may occur due to an electromagnetic wave leaked from a wiring connected to the light emitting element, in which case, it is difficult to support high speed communication of 10 Gbps or higher. Further, it is difficult to downsize an optical module which uses the package type optoelectric converting device.

In contrast, a substrate-mounted optoelectric converting device, which has a light emitting element mounted on a circuit substrate, does not cause a crosstalk as in the package type optoelectric converting device and has an advantage that it is possible to reduce the number of parts and cost and can be downsized. However, because the substrate-mounted optoelectric converting device does not have a glass window, it is difficult to provide a function of generating monitor light at the side of the light emitting element.

To solve the above problems, for example, PTL 3 has proposed an optical module in which a reflecting surface for reflecting part of the light emitted from a light emitting element to a side of a light receiving element as monitor light is disposed at an optical receptacle. This configuration realizes stable high speed communication along with monitoring of output of the light emitting element.

CITATION LIST

Patent Literature

PTL 1
Japanese Patent Application Laid-Open No. 2000-340877
PTL 2
Japanese Patent Application Laid-Open No. 2004-221420
PTL 3
Japanese Patent Application Laid-Open No. 2008-151894

SUMMARY OF INVENTION

Technical Problem

In the optical module described in PTL 3, the light emitted from the light emitting element is extracted from the optical receptacle so as to be directed in a direction perpendicular to a substrate of the optoelectric converting device at an end face of an optical fiber. Depending on use modes of the optical module, however, it may be required to extract the light emitted from the light emitting element from the optical receptacle so as to be directed in a direction along the substrate at the end face of the optical fiber, in which case, it is required to employ a method which is different from that used in the invention described in PTL 3.

It is therefore an object of the present invention to provide an optical receptacle which can emit light emitted from a light emitting element in a direction along a substrate while extracting monitor light for monitoring the light emitting element and an optical module having the optical receptacle.

Solution to Problem

An optical receptacle according to the present invention is disposed between an optoelectric converting device and an optical fiber, the optoelectric converting device having a light emitting element and a light receiving element for monitoring light emitted from the light emitting element disposed on a substrate, the optical receptacle optically coupling the light emitting element and an end face of the optical fiber, and the optical receptacle includes a first optical surface which receives incidence of the light emitted from the light emitting element, a reflecting surface that reflects the light incident from the first optical surface in a direction along the substrate, a recess which has an emitting region for emitting part of the light reflected at the reflecting surface and an incidence surface for receiving again incidence of the light emitted from the emitting region, a light separating section which is disposed in the emitting region, separates the light reflected at the reflecting surface into monitor light directed to the light receiving element and signal light directed to the end face of the optical fiber, and reflects the monitor light toward the light receiving element, while emitting the signal light to the recess, a second optical surface which emits the monitor light separated at the light separating section toward the light receiving element, and a third optical surface that emits the signal light which has been emitted from the light separating section and incident again from the incidence surface toward the end face of the optical fiber, in which optical receptacle the light separating section includes a plurality of separating units, each of the separating units including a splitting reflecting surface that is an inclining surface with respect to the optical axis of the light reflected at the reflecting surface, a splitting transmissive surface that is a vertical surface with respect to the optical axis and a splitting stepped surface that is a parallel surface with respect to the optical axis, and in each of the separating units, the splitting reflecting surface, the splitting stepped surface and the splitting transmissive surface are arranged in a first direction that is an inclining direction of the splitting reflecting surface, in the light separating section, the plurality of separating units are arranged in the first direction, a plurality of the splitting reflecting surfaces are disposed on the same virtual plane and reflect part of the light reflected at the reflecting surface toward the second optical surface, a plurality of the splitting transmissive surfaces transmit part of the light reflected at the reflecting surface to the recess, a plurality of the splitting stepped surfaces connect the splitting reflecting surfaces and the splitting transmissive surfaces, and in the light separating section, the plurality of separating units are disposed so that 4 to 6 separating units exist in a region where the light reflected at the reflecting surface is incident, and a height of a boundary between the splitting transmissive surface and the splitting stepped surface with respect to the virtual plane falls within a range of 13 to 21 μm.

An optical module according to the present invention has an optoelectric converting device having a light emitting element and a light receiving element for monitoring light emitted from the light emitting element, and the optical receptacle according to the present invention.

Advantageous Effects of Invention

According to the optical module having the optical receptacle of the present invention, it is possible to easily and appropriately realize optical communication in which the light emitted from the light emitting element is monitored and the light emitted from the light emitting element is extracted in a direction along the substrate at the end face of the optical fiber.

DESCRIPTION OF EMBODIMENTS

Embodiments according to the present invention will be described in detail below with reference to the drawings.

Embodiment 1

(Configuration of Optical Module)

Figure 1:
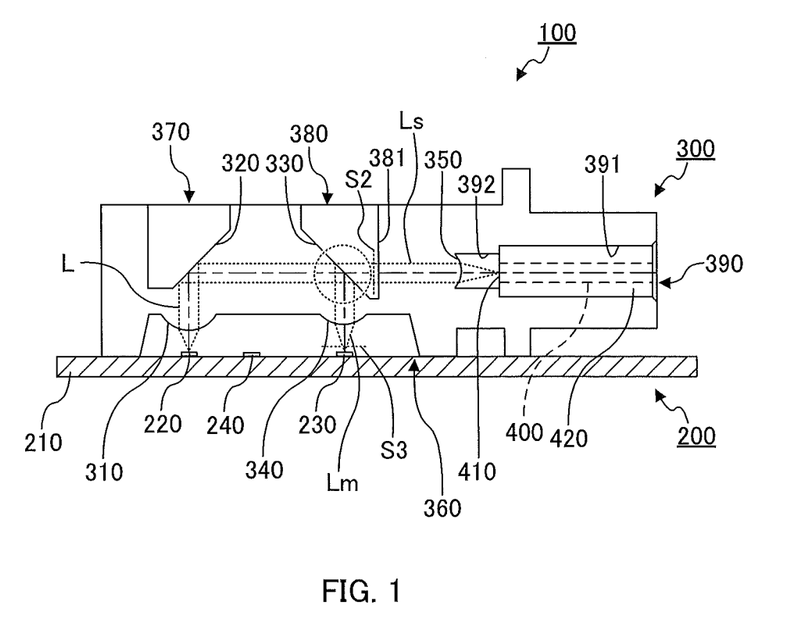
FIG. 1 is a cross-sectional view (a view of optical paths) of an optical module according to Embodiment 1 of the present invention.

FIG. 1 is a cross-sectional view of optical module 100 according to Embodiment 1 of the present invention. In FIG. 1, a hatching of a cross section of optical receptacle 300 is omitted in order to illustrate optical paths inside optical receptacle 300.

As illustrated in FIG. 1, optical module 100 has substrate-mounted optoelectric converting device 200 including light emitting element 220, and optical receptacle 300. Optical module 100 is used with optical fiber 400 connected to optical receptacle 300. Optoelectric converting device 200 and optical receptacle 300 are fixed by publicly known fixing means such as an adhesive (for example, a thermosetting/ultraviolet curable resin). Optical receptacle 300 optically couples light emitting element 220 and an end face 410 of optical fiber 400 while optical receptacle 300 is disposed between optoelectric converting device 200 and optical fiber 400.

Optoelectric converting device 200 has semiconductor substrate 210, light emitting element 220, light receiving element 230 and control section 240.

Light emitting element 220 which is disposed on semiconductor substrate 210, emits laser light L in a direction vertical to a surface of semiconductor substrate 210. Light emitting element 220 is, for example, a Vertical Cavity Surface Emitting Laser (VCSEL).

Light receiving element 230 which is disposed on the same face of semiconductor substrate 210 on which light emitting element 220 is disposed, receives monitor light Lm for monitoring output (for example, intensity and an amount of light) of laser light L emitted from light emitting element 220. Light receiving element 230 is, for example, a photodetector.

Control section 240 which is disposed on the same face of semiconductor substrate 210 on which light emitting element 220 and light receiving element 230 are disposed, is electrically connected to light emitting element 220 and light receiving element 230 via a wiring which is not illustrated. Control section 240 controls output of laser light L emitted from light emitting element 220 based on intensity and an amount of monitor light Lm received by light receiving element 230.

Optical receptacle 300 is disposed on optoelectric converting device 200 so that first optical surface 310 faces light emitting element 220 and second optical surface 340 faces light receiving element 230. Optical receptacle 300 which is formed with an optical transparent material, is integrally manufactured by, for example, injection molding. Optical receptacle 300 allows light L emitted from light emitting element 220 of optoelectric converting device 200 to be incident inside through first optical surface 310 and separates light L into monitor light Lm and signal light Ls. Optical receptacle 300 emits monitor light Lm from second optical surface 340 toward light receiving element 230 of optoelectric converting device 200, and emits signal light Ls from third optical surface 350 toward end face 410 of optical fiber 400.

Because optical module 100 of the present embodiment is mainly characterized by a configuration of optical receptacle 300, optical receptacle 300 will be described separately in detail later.

As described above, optical fiber 400 is connected to optical receptacle 300. Optical fiber 400 is a single-mode optical fiber or a multi-mode optical fiber.

(Configuration of Optical Receptacle)

Figure 2A:
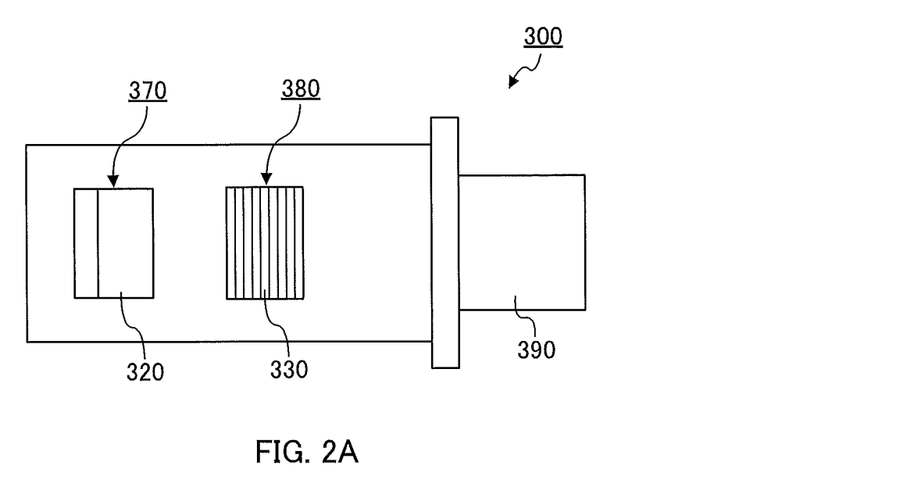
FIGS. 2A and 2B show a configuration of an optical receptacle according to Embodiment 1 of the present invention.
Figure 2B:
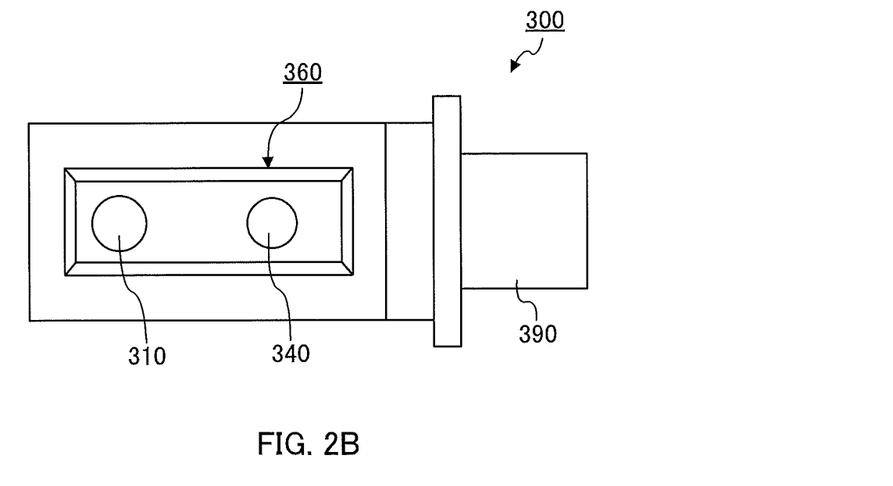

FIG. 2A is a plan view of optical receptacle 300, and FIG. 2B is a bottom view of optical receptacle 300. As illustrated in FIG. 1, FIGS. 2A and 2B, optical receptacle 300 is a member having a substantially rectangular parallelepiped shape. Optical receptacle 300 is formed using a material having optical transparency with respect to light of a wavelength used for optical communication. Examples of such a material include a transparent resin such as polyetherimide (PEI) and cyclic olefin resins. Optical receptacle 300 can be integrally manufactured by, for example, injection molding.

A shape of optical receptacle 300 will be described first using six faces (top face, bottom face, front face, back face, right side face and left side face) of this rectangular parallelepiped. The following description will be provided assuming that a face of optical receptacle 300 at a side of optical fiber 400 is a "right side face". It should be noted that when optical receptacle 300 is manufactured by injection molding, tapers may be formed at the right side face and at the left side face for punching.

As illustrated in FIG. 1 and FIG. 2B, first recess 360 in the shape of a square pyramid is formed on the bottom face. First recess 360 is a space for accommodating light emitting element 220, light receiving element 230 and control section 240. A bottom face of first recess 360 is parallel to a surface of semiconductor substrate 210. On the bottom face of first recess 360, first optical surface 310 is formed so as to face light emitting element 220, and second optical surface 340 is formed so as to face light receiving element 230. It should be noted that a shape of first recess 360 should not particularly be limited, and may be, for example, a rectangular parallelepiped.

Further, on the top face, second recess 370 in the shape of a pentagonal prism and third recess 380 in the shape of a substantially pentagonal prism are formed side by side in a length direction of the rectangular parallelepiped. Part of an inner surface of second recess 370 serves as reflecting surface 320, while part of an inner surface of third recess 380 serves as light separating section 330 (emitting region), and an inner surface which faces light separating section 330 serves as incidence surface 381. It should be noted that a shape of second recess 370 should not particularly be limited as long as reflecting surface 320 can be disposed at a predetermined position. Further, a shape of third recess 380 should not particularly be limited as long as light separating section 330 and incidence surface 381 can be disposed at predetermined positions.

Further, on the right side face, cylindrical optical fiber mounting section 390 for connecting optical fiber 400 is provided. Optical fiber mounting section 390 has cylindrical fourth recess 391 and cylindrical fifth recess 392 formed on a bottom face of fourth recess 391. Fourth recess 391 is a portion for mounting cylindrical ferrule 420 attached to an end portion of optical fiber 400. The end portion of optical fiber 400 is disposed in parallel to the surface of semiconductor substrate 210 by being inserted into optical fiber mounting section 390 (fourth recess 391) with ferrule 420 being attached. On a bottom face of fifth recess 392, third optical surface 350 is formed so as to face end face 410 of mounted optical fiber 400.

Optical components of optical receptacle 300 will be described next.

As illustrated in FIG. 1, FIGS. 2A and 2B, optical receptacle 300 has first optical surface 310, reflecting surface 320, light separating section 330, second optical surface 340, incidence surface 381 and third optical surface 350.

First optical surface 310 is disposed on a side of the bottom face of optical receptacle 300 so as to face light emitting element 220. In the present embodiment, first optical surface 310 is a convex lens surface. First optical surface 310 has a circular shape in a plan view. First optical surface 310 allows laser light L emitted from light emitting element 220 to be incident inside optical receptacle 300. At this time, first optical surface 310 converts laser light L into collimated light L. In the following description, a diameter of a cross section in a direction orthogonal to a travelling direction of converted collimated light L will be referred to as a "light flux diameter (an effective diameter) of collimated light L". Collimated light L converted by first optical surface 310 travels toward reflecting surface 320. The central axis of first optical surface 310 is perpendicular to a light emitting surface of light emitting element 220 (and a surface of semiconductor substrate 210). The central axis of first optical surface 310 preferably corresponds with the optical axis of light L emitted from light emitting element 220. It should be noted that in the present embodiment, the light flux diameter of collimated light L is approximately 0.2 to 0.25 μm.

Reflecting surface 320 is an inclining surface formed at a side of the top face of optical receptacle 300. Reflecting surface 320 is inclined so as to approach optical fiber 400 as reflecting surface 320 approaches the top face from the bottom face of optical receptacle 300. In the present embodiment, an inclining angle of reflecting surface 320 is 45° with respect to the optical axis of light L incident from first optical surface 310. On reflecting surface 320, collimated light L incident from first optical surface 310 is internally incident at an incidence angle greater than a critical angle. Reflecting surface 320 totally reflects incident light L in a direction along the surface of semiconductor substrate 210. That is, reflecting surface 320 receives incidence of collimated light L having a predetermined light flux diameter and emits collimated light L having a predetermined light flux diameter.

Light separating section 330 (an emitting region of third recess 380), which is comprised of a plurality of faces, is disposed at a side of a top face of optical receptacle 300. Light separating section 330 separates collimated light L, which is reflected at reflecting surface 320 and which has a predetermined light flux diameter, into monitor light Lm directed to light receiving element 230 and signal light Ls directed to end face 410 of optical fiber 400. Signal light Ls is emitted to third recess 380. Both signal light Ls and monitor light Lm separated at light separating section 330 are collimated light. Outlines of signal light Ls and monitor light Lm in a direction orthogonal to a traveling direction are circles each having a diameter of the above-described light flux diameter. As optical module 100 of the present embodiment is mainly characterized by light separating section 330 of optical receptacle 300, light separating section 330 will be described separately in detail later.

Second optical surface 340 is disposed at a side of the bottom face of optical receptacle 300 so as to face light receiving element 230. In the present embodiment, second optical surface 340 is a convex lens surface. Second optical surface 340 converges monitor light Lm separated at light separating section 330 and emits converged monitor light Lm toward light receiving element 230. By this means, it is possible to efficiently couple monitor light Lm to light receiving element 230. The central axis of second optical surface 340 is preferably perpendicular to a light receiving surface (semiconductor substrate 210) of light receiving element 230.

Incidence surface 381, which is disposed at a side of the top face of optical receptacle 300, allows signal light Ls emitted at light separating section 330 to be incident inside optical receptacle 300 again. In the present embodiment, incidence surface 381 is a vertical surface with respect to signal light Ls separated at light separating section 330. By this means, it is possible to allow signal light Ls directed to end face 410 of optical fiber 400 to be incident inside optical receptacle 300 again without being refracted.

Third optical surface 350 is disposed at a side of the right side face of optical receptacle 300 so as to face the end face of optical fiber 400. In the present embodiment, third optical surface 350 is a convex lens surface. Third optical surface 350 converges signal light Ls incident inside optical receptacle 300 again from incidence surface 381 and emits converged signal light Ls toward end face 410 of optical fiber 400. By this means, it is possible to efficiently couple signal light Ls to end face 410 of optical fiber 400. The central axis of third optical surface 350 preferably corresponds with the central axis of end face 410 of optical fiber 400.

Because, in optical receptacle 300 of the present embodiment, light L emitted from light emitting element 220 is allowed to be incident after being converted into collimated light having a constant light flux diameter by first optical surface 310, it is possible to treat only the collimated light. By this means, even if measurement errors occur in optical receptacle 300 in a traveling direction of the light, it is possible to secure an amount of light to end face 410 of optical fiber 400 and to light receiving element 230 and a position where incident light is concentrated on optical fiber 400 and light receiving element 230. As a result, it is possible to relax measurement accuracy required for optical receptacle 300 and improve manufacturability while maintaining optical performance.

Figure 3A:
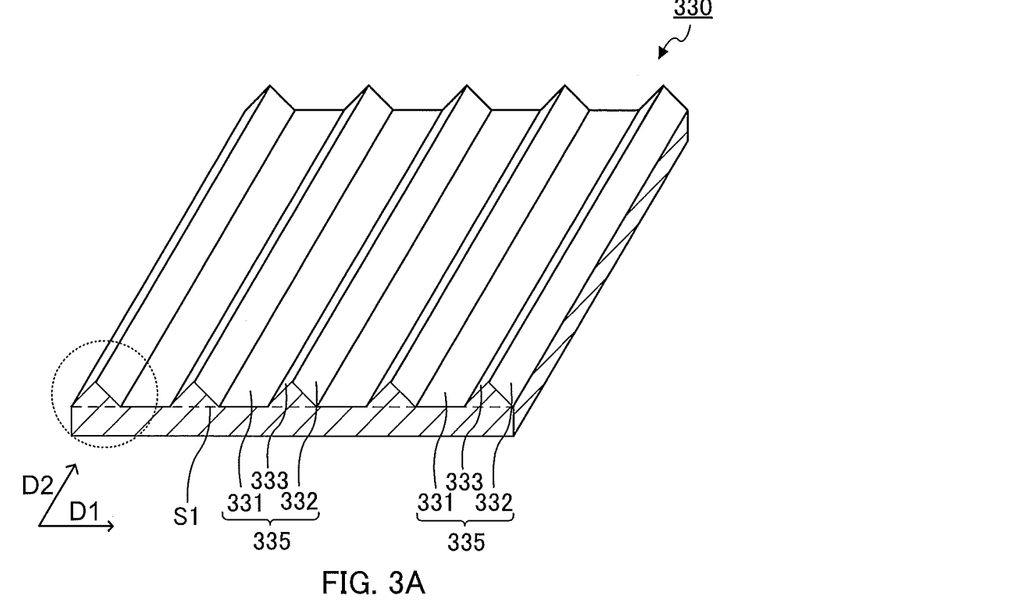
FIGS. 3A and 3B show a configuration of a light separating section.
Figure 3B:
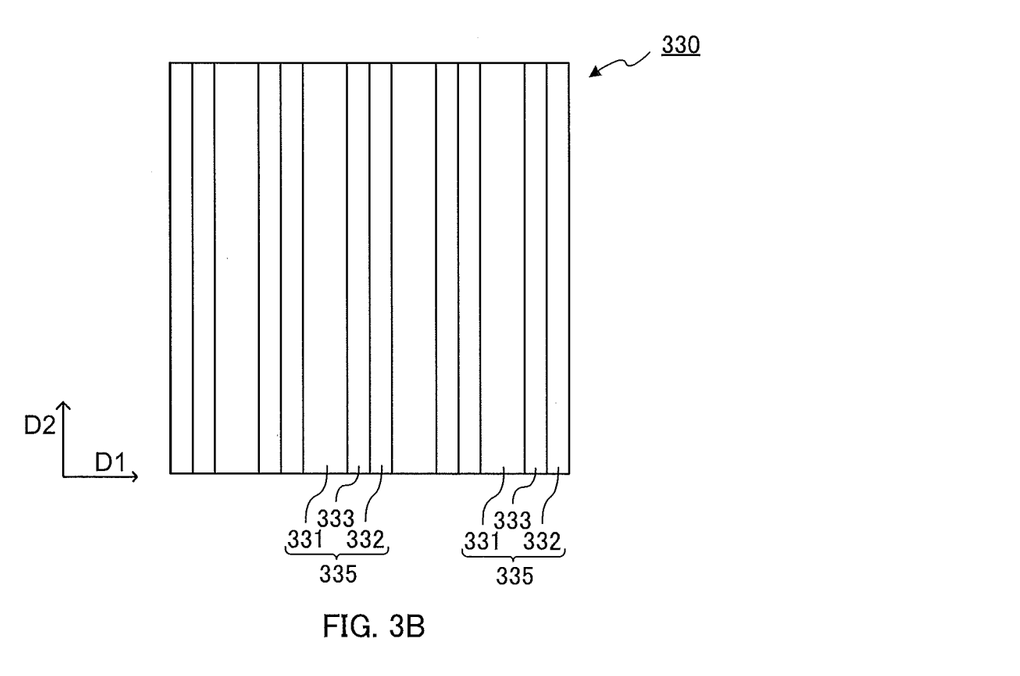
Figure 4A:
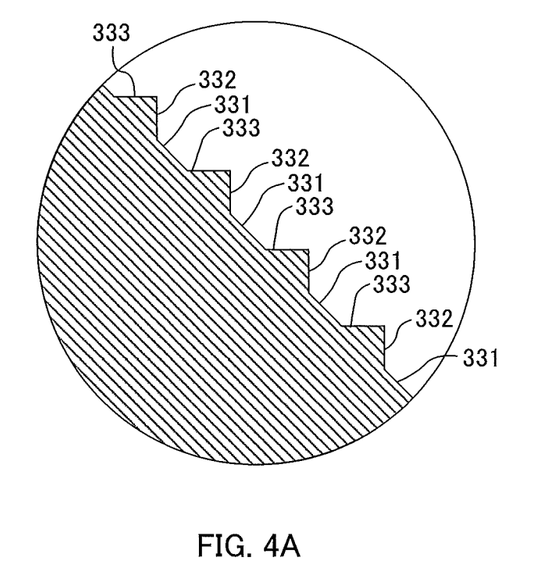
FIGS. 4A and 4B are partial enlarged views showing the configuration of the light separating section.
Figure 4B:
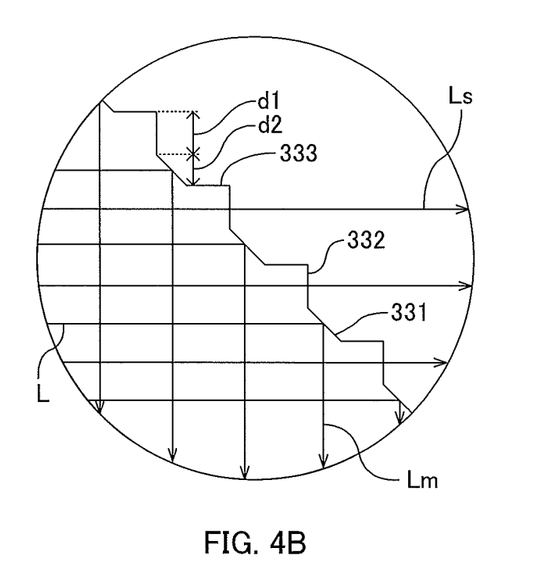
Figure 5A:
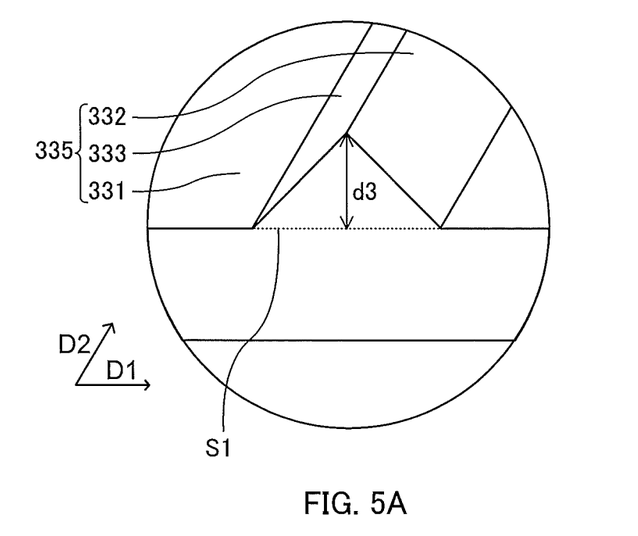
FIGS. 5A and 5B show the configuration of the light separating section.
Figure 5B:
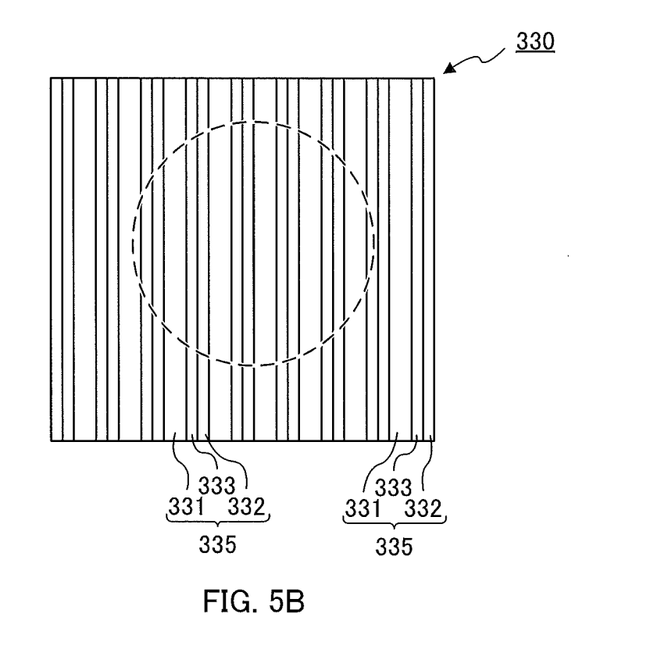

A configuration of light separating section 330 will be described next. FIGS. 3A, 3B, 4A, 4B, 5A and 5B illustrate the configuration of light separating section 330. FIG. 3A is a perspective view of light separating section 330, and FIG. 3B is a plan view of light separating section 330. FIG. 4A is a partial enlarged cross-sectional view of a region indicated with a dashed line in FIG. 1, and FIG. 4B is a partial enlarged cross-sectional view illustrating optical paths of light separating section 330. FIG. 5A is a partial enlarged cross-sectional view of a region indicated with a dashed line in FIG. 3A, and FIG. 5B illustrates the number of light separating sections 330 in a region where collimated light L is incident. In FIG. 4B, a hatching of a cross section of optical receptacle 300 is omitted in order to illustrate optical paths inside optical receptacle 300. Further, also in FIG. 5A, a hatching of a cross section of optical receptacle 300 is omitted.

As shown in FIGS. 3A, 3B, 4A and 4B, light separating section 330 has a plurality of separating units 335. Although described in detail later, a plurality of separating units 335 are disposed in light separating section 330 so that 4 to 6 separating units 335 exist within a region where light L reflected at reflecting surface 320 is incident. Each of separating units 335 includes one splitting reflecting surface 331, one splitting transmissive surface 332 and one splitting stepped surface 333. That is, light separating section 330 has a plurality of splitting reflecting surfaces 331, a plurality of splitting transmissive surfaces 332 and a plurality of splitting stepped surfaces 333. As will be described later, splitting reflecting surfaces 331 are inclining surfaces with respect to the optical axis of collimated light L reflected at reflecting surface 320. In the following description, an inclining direction of splitting reflecting surfaces 331 will be referred to as a first direction (see arrow D1 shown in FIGS. 3A and 3B). Splitting reflecting surfaces 331, splitting transmissive surfaces 332 and splitting stepped surfaces 333 are split in the first direction.

Splitting reflecting surfaces 331 are inclining surfaces with respect to the optical axis of collimated light L reflected at reflecting surface 320. Splitting reflecting surfaces 331 reflect part of collimated light L reflected at reflecting surface 320 toward second optical surface 340. In the present embodiment, splitting reflecting surfaces 331 are inclined so as to approach third optical surface 350 (optical fiber 400) as splitting reflecting surfaces 331 approach the bottom face from the top face of optical receptacle 300. An inclining angle of splitting reflecting surfaces 331 is 45° with respect to the optical axis of collimated light L reflected at reflecting surface 320. Splitting reflecting surfaces 331 are split in the first direction and disposed at predetermined intervals. Further, a plurality of splitting reflecting surfaces 331 are disposed on the same virtual plane S1 (see FIG. 3A and FIG. 5A).

Splitting transmissive surfaces 332 are surfaces which are formed at positions different from splitting reflecting surfaces 331 and which are perpendicular to the optical axis of collimated light L reflected at reflecting surface 320. Splitting transmissive surfaces 332 transmit part of collimated light L reflected at reflecting surface 320 and emit the light to third recess 380. Splitting transmissive surfaces 332 are also split in the first direction and disposed at predetermined intervals. A plurality of splitting transmissive surfaces 332 are disposed in parallel to each other in the first direction.

Splitting stepped surfaces 333 which are parallel surfaces with respect to the optical axis of collimated light L reflected at reflecting surface 320, connect splitting reflecting surfaces 331 and splitting transmissive surfaces 332. A plurality of splitting stepped surfaces 333 are disposed in parallel to each other in the first direction.

In one separating unit 335, splitting reflecting surface 331, splitting stepped surface 333 and splitting transmissive surface 332 are arranged in the first direction (in a direction toward the bottom face from the top face) in this order. A ridge line is formed between splitting transmissive surface 332 and splitting stepped surface 333. A plurality of ridge lines adjacent in the first direction are disposed in parallel to each other. A smaller angle formed by splitting transmissive surface 332 and splitting stepped surface 333 is 90°. Further, a smaller angle formed by splitting transmissive surface 332 and splitting reflecting surface 331 (of adjacent separating unit 335) is 135°. Still further, a smaller angle formed by splitting stepped surface 333 and splitting reflecting surface 331 is also 135°. A plurality of separating units 335 are arranged in the first direction in light separating section 330. Height d3 of a boundary between splitting transmissive surface 332 and splitting stepped surface 333 with respect to virtual plane S1 including splitting reflecting surface 331 falls within a range of 13 to 21 μm (see FIG. 5A).

As shown in FIG. 4B, part of collimated light L reflected at reflecting surface 320 is internally incident on splitting reflecting surfaces 331 at an incidence angle greater than a critical angle. Splitting reflecting surfaces 331 reflect part of incident collimated light L toward second optical surface 340 to generate monitor light Lm. Meanwhile, splitting transmissive surfaces 332 transmit part of collimated light L reflected at reflecting surface 320 to generate signal light Ls directed to end face 410 of optical fiber 400. Signal light Ls is emitted to third recess 380. At this time, because splitting transmissive surfaces 332 are vertical surfaces with respect to collimated light L, signal light Ls is not refracted. It should be noted that in light separating section 330, because splitting stepped surfaces 333 are formed in parallel to an incidence direction of collimated light L, collimated light L is not incident on splitting stepped surfaces 333.

A ratio of an amount of signal light Ls and an amount of monitor light Lm should not particularly be limited as long as an amount of monitor light Lm which enables monitoring of intensity or an amount of light L emitted from the light emitting element can be obtained while a desired amount of signal light Ls can be obtained. The ratio of the amount of signal light Ls and the amount of monitor light Lm (signal light Ls: monitor light Lm) is preferably 6:4 to 8:2, more preferably, 7:3.

In theory, the ratio of the amount of signal light Ls and the amount of monitor light Lm is proportional to an area ratio of splitting transmissive surfaces 332 and splitting reflecting surfaces 331 when seen from a side of reflecting surface 320. For example, if a ratio of dimension d1 of splitting transmissive surfaces 332 and dimension d2 of splitting reflecting surfaces 331 in a direction parallel to splitting transmissive surfaces 332 in a cross section shown in FIG. 4B is 1:1, the amount of signal light Ls and the amount of monitor light Lm should be 50% each when the amount of collimated light L incident on light separating section 330 is assumed to be 100%.

Meanwhile, optical receptacle 300 can be manufactured using injection molding as described above. In the manufacturing method using injection molding, optical receptacle 300 is molded by curing a molten resin poured inside (a cavity of) a mold. Therefore, there is a case where in optical receptacle 300, a molding defective may occur at an edge portion due to a gas not outgassing from the cavity, or a desired shape cannot be obtained due to shrinkage of a resin in a cooling step or due to a transfer failure. Further, in optical receptacle 300, a light loss occurs depending on the type of a material of optical receptacle 300. Therefore, even if splitting transmissive surfaces 332 and splitting reflecting surfaces 331 are designed so as to achieve a desired ratio of the amount of signal light Ls and the amount of monitor light Lm, the desired ratio of the amount of light often cannot be achieved.

Inventors of the present invention found optimal arrangement and shape of separating units 335 in light separating section 330 to generate signal light Ls and monitor light Lm at a predetermined ratio of the amount of light taking into account the characteristics of optical receptacle 300 and errors in manufacturing through injection molding. In the present embodiment, the ratio of the amount of signal light Ls and the amount of monitor light Lm (signal light Ls: monitor light Lm) is 7:3. It should be noted that in the following description, a "height of separating units 335" means shortest distance d3 from the above-described first virtual plane S1 to a boundary between splitting transmissive surfaces 332 and splitting stepped surfaces 333.

The inventors of the present invention have implemented three types of simulations (simulations 1 to 3) with different conditions and have obtained an optimal shape of light separating section 330 (arrangement and a shape of separating units 335) from results of these simulations. Simulation 1 is performed taking into account only the shape of optical receptacle 300. Simulation 2 is performed taking into account a material of optical receptacle 300 in addition to the conditions of simulation 1. Simulation 3 is performed taking into account an error in manufacturing in addition to the conditions of simulation 2. It should be noted that in simulations 1 to 3, the amount of laser light L emitted from light emitting element 220 is the same. Further, in simulations 1 to 3, an amount of light reaching second virtual plane S2 set near incidence surface 381 is regarded as the amount of signal light Ls (see FIG. 1). Still further, in simulations 1 to 3, an amount of light reaching third virtual plane S3 set near light receiving element 230 is regarded as the amount of monitor light Lm (see FIG. 1).

In simulations 1 to 3, the amounts of light are simulated in each case where the number of separating units 335 in a region of light separating section 330 where collimated light L is incident is changed within a range of 2 to 12, and a case where the height of separating units 335 is changed to 7, 10, 12, 15, 21, 25 and 35 µm.

In simulation 1, the amount of signal light Ls and the amount of monitor light Lm generated from light L emitted from light emitting element 220 are obtained taking into account only the shape of optical receptacle 300. In simulation 1, the ratio of dimension d1 of splitting transmissive surfaces 332 and dimension d2 of splitting reflecting surfaces 331 shown in FIG. 4B is set to be 7:3. Further, a smaller angle formed by splitting transmissive surfaces 332 and splitting stepped surfaces 333 is set to be 90°. Still further, a smaller angle formed by splitting transmissive surfaces 332 and splitting reflecting surfaces 331 and a smaller angle formed by splitting stepped surfaces 333 and splitting reflecting surfaces 331 are set to be 135°. The amount of signal light Ls and the amount of monitor light Lm are obtained while the arrangement of separating units 335 and the height of separating units 335 are changed within a range which satisfies these conditions.

In simulation 2, the amount of signal light Ls and the amount of monitor light Lm are obtained taking into account a light loss according to a material of optical receptacle 300 in addition to the conditions (the shape of optical receptacle 300) of simulation 1. In simulation 2, polyetherimide (PEI) is used as a material of optical receptacle 300.

In simulation 3, the amount of signal light Ls and the amount of monitor light Lm are obtained taking into account an error in manufacturing through injection molding in addition to the conditions (the shape and the material of optical receptacle 300) of simulation 2. Here, the error in manufacturing refers to a case where a smaller angle) (90° formed by splitting transmissive surfaces 332 and splitting stepped surfaces 333 increases or decreases by 1° and R (a radius of curvature) of a connection portion (a ridge line portion) of splitting transmissive surfaces 332 and splitting stepped surfaces 333 in the first direction becomes 3 µm.

Figure 6A:
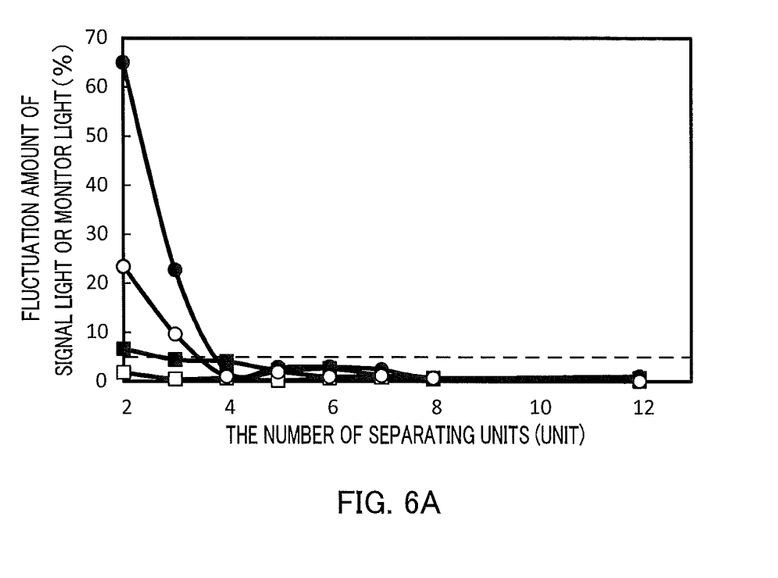
FIGS. 6A and 6B are graphs showing a relationship between arrangement or a height of separating units and a fluctuation amount of signal light and monitor light.
Figure 6B:
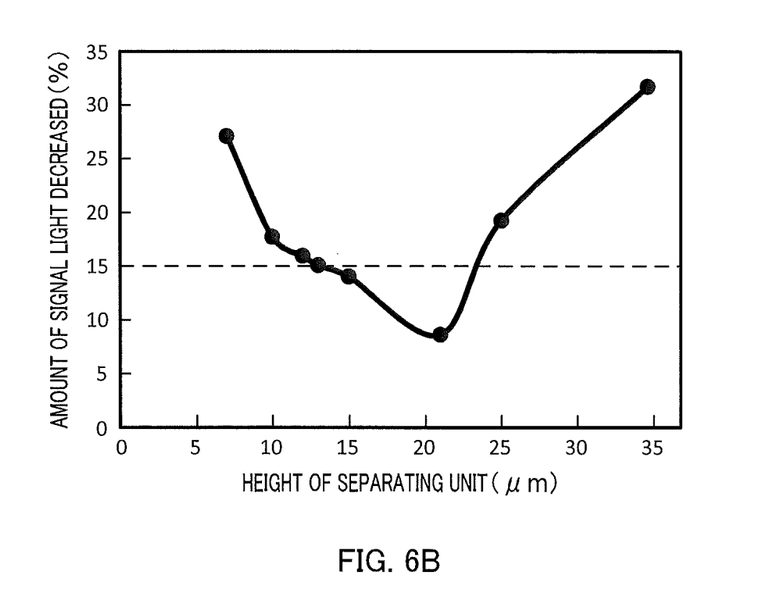

FIGS. 6A and 6B are graphs showing a relationship between arrangement or the height of separating units 335 and a fluctuation amount of signal light Ls and monitor light Lm. FIG. 6A is a graph showing a relationship between the number of separating units 335 in a region of light separating section 330 where collimated light L is incident and the fluctuation amount of light (signal light Ls or monitor light Lm), and FIG. 6B is a graph showing a relationship between the height of separating units 335 and the amount of signal light Ls decreased. It should be noted that in FIG. 6A, a filled square symbol indicates a fluctuation amount of monitor light Lm in simulation 2 with respect to the amount of monitor light Lm in simulation 1, while a hollow square symbol indicates a fluctuation amount of signal light Ls in simulation 2 with respect to the amount of signal light Ls in simulation 1. Further, a filled circle symbol indicates a fluctuation amount of monitor light Lm in simulation 3 with respect to the amount of monitor light Lm in simulation 1, while a hollow circle symbol indicates a fluctuation amount of signal light Ls in simulation 3 with respect to the amount of signal light Ls in simulation 1. Further, a dashed line indicated in FIG. 6A indicates a position where the fluctuation amount of signal light Ls or monitor light Lm is 5%. A filled circle symbol in FIG. 6B indicates an amount of signal light Ls decreased in simulation 3 with respect to the amount of signal light Ls in simulation 1. Further, a dashed line indicated in FIG. 6B indicates a position where the amount of signal light Ls decreased is 15%.

As shown in FIG. 6A, it can be understood that the fluctuation amount of signal light Ls or monitor light Lm in simulation 2 with respect to the amount of signal light Ls or monitor light Lm in simulation 1 is less than 5% if the number of separating units 335 is 4 or more. Further, it can be understood that the fluctuation amount of signal light Ls or monitor light Lm in simulation 3 with respect to the amount of signal light Ls or monitor light Lm in simulation 1 is also less than 5% if the number of separating units 335 is 4 or more.

Further, as shown in FIG. 6B, it can be understood that the amount of signal light Ls decreased in simulation 3 with respect to the amount of signal light Ls in simulation 1 is less than 15% if the height of separating units 335 falls within a range of 13 to 21 μm.

Therefore, it can be understood from the simulations that if the number of separating units 335 in the region of light separating section 330 where collimated light L is incident is from 4 to 6 and the height of separating units 335 is from 13 to 21 μm, a desired amount of signal light Ls and a desired amount of monitor light Lm can be obtained.

It should be noted that though a result is not shown, it is known that if a ratio of the amount of signal light Ls as transmissive light and the amount of monitor light Lm as reflected light falls within a range from 20:80 to 80:20, when the number of separating units 335 in a predetermined light flux diameter is 4 to 6, and the height of separating units 335 is 13 to 21 μm desired amount of signal light Ls and a desired amount of monitor light Lm can be obtained.

(Effects)

As described above, optical receptacle 300 according to Embodiment 1 reflects laser light L emitted from light emitting element 220 along the surface of semiconductor substrate 210 using reflecting surface 320 and separates the light into monitor light Lm and signal light Ls by reflection by splitting reflecting surfaces 331 and transmission by splitting transmissive surfaces 332. Monitor light Lm is emitted toward light receiving element 230 from second optical surface 340, and signal light Ls is emitted toward end face 410 of optical fiber 400 from third optical surface 350 without changing its traveling direction. Accordingly, optical receptacle 300 can direct signal light Ls at end face 410 of optical fiber 400 to a direction along semiconductor substrate 210 while acquiring monitor light Lm for monitoring the light emitted from light emitting element 220. Further, optical receptacle 300 can generate a desired amount of signal light Ls and a desired amount of monitor light Lm regardless of a material of optical receptacle 300 and an error in manufacturing.

It should be noted that splitting reflecting surface 331, splitting stepped surface 333 and splitting transmissive surface 332 may be arranged in the first direction in this order in a direction directed to the top face from the bottom face of optical receptacle 300. In this case, a plurality of splitting stepped surfaces 333 and a plurality of splitting transmissive surfaces 332 are arranged closer to reflecting surface 320 than splitting reflecting surfaces 331.

Further, while a case has been described where in optical receptacle 300 according to Embodiment 1, first optical surface 310, second optical surface 340 and third optical surface 350 are convex lens surfaces with curvature, first optical surface 310, second optical surface 340 and third optical surface 350 may be planes with no curvature. Specifically, only first optical surface 310 may be a plane, only second optical surface 340 may be a plane, or only third optical surface 350 may be a plane. If first optical surface 310 is formed in a planar shape, for example, reflecting surface 320 is formed so as to be able to serve as a concave mirror. Further, if second optical surface 340 is formed in a planar shape, there is a case where part of light emitted from second optical surface 340 may not reach a light receiving surface of light receiving element 230, which, however, is not a serious problem for light receiving element 230 to monitor light L emitted from light emitting element 220. Further, if light L immediately before reaching third optical surface 350 is effectively converged by first optical surface 310, reflecting surface 320, or the like, third optical surface 350 may be formed in a planar shape.

Embodiment 2

(Configuration of Optical Module)

Optical receptacle 600 and optical module 500 according to Embodiment 2 which are lens array type optical receptacle and optical module, are different from optical receptacle 300 and optical module 100 according to Embodiment 1 in that optical receptacle 600 and optical module 500 allow for multi-channel optical communication along with monitoring. It should be noted that the same reference numerals are assigned to the components which are the same as those of optical receptacle 300 and optical module 100 of Embodiment 1, and the explanation thereof will be omitted.

Figure 7:
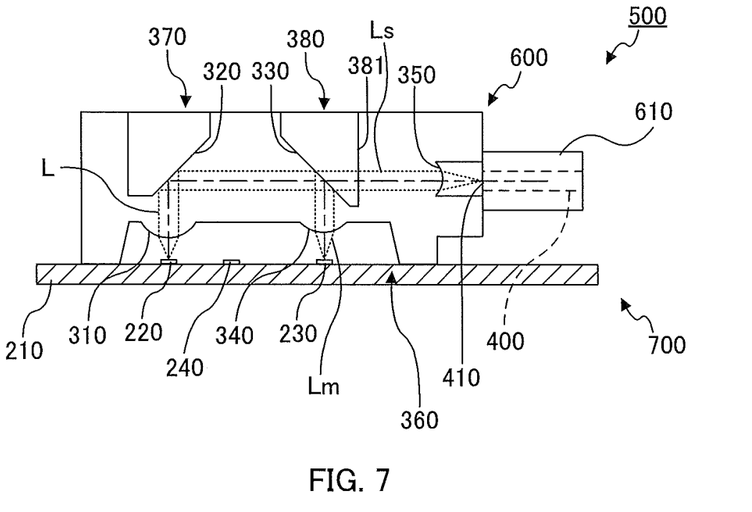
FIG. 7 is a cross-sectional view (a view of optical paths) of an optical module according to Embodiment 2 of the present invention.
Figure 8A:
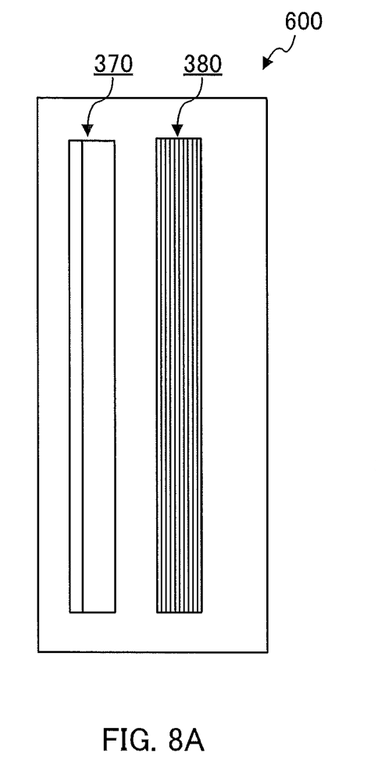
FIGS. 8A to 8C show a configuration of an optical receptacle according to Embodiment 2 of the present invention.
Figure 8B:
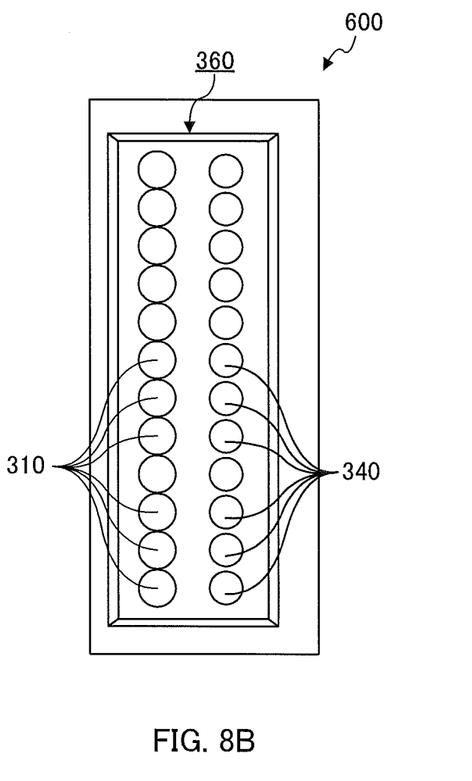
Figure 8C:
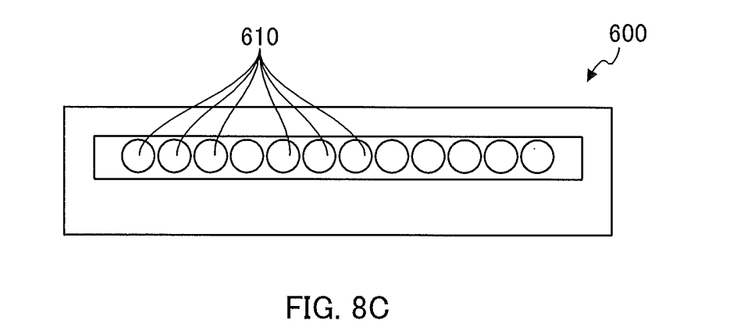

FIG. 7 is a cross-sectional view of optical module 500 according to Embodiment 2. In FIG. 7, a hatching of a cross section of optical receptacle 600 is omitted in order to illustrate optical paths inside optical receptacle 600. FIGS. 8A to 8C show a configuration of optical receptacle 600 according to Embodiment 2. FIG. 8A is a plan view of optical receptacle 600, FIG. 8B is a bottom view of optical receptacle 600, and FIG. 8C illustrates a right side face of optical receptacle 600.

As illustrated in FIG. 7, optical module 500 according to Embodiment 2 has optoelectric converting device 700 and optical receptacle 600. In optical module 500 according to Embodiment 2, optical fiber 400 is attached to optical receptacle 600 via publicly known mounting means with optical fiber 400 accommodated in multicore batch connector 610.

Optoelectric converting device 700 has a plurality of light emitting elements 220, a plurality of light receiving elements 230 and control section 240. The plurality of light emitting elements 220 are arranged in line on semiconductor substrate 210. In FIG. 8, the plurality of light emitting elements 220 are arranged in line from a front side toward a back side on the sheet. Meanwhile, the plurality of light receiving elements 230 are arranged in line on semiconductor substrate 210 so as to be parallel to a direction the plurality of light emitting elements 220 are arranged. The plurality of light emitting elements 220 and the plurality of light receiving elements 230 are arranged at the same intervals so as to correspond to each other. The plurality of light receiving elements 230 receive monitor light Lm for monitoring output of corresponding light emitting elements 220, or the like.

Optical receptacle 600 is formed so as to secure optical paths between each light emitting element 220 and each optical fiber 400 and optical paths between each light emitting element 220 and each light receiving element 230 according to such configurations of optoelectric converting device 700 and optical fiber 400. Specifically, the plurality of first optical surfaces 310, the plurality of second optical surfaces 340 and the plurality of third optical surfaces 350 are arranged in a front-back direction on the sheet of FIG. 7 (a vertical direction in FIGS. 8A and 8B) so as to secure an optical path of laser light L for each light emitting element 220. Further, reflecting surface 320 and light separating section 330 are formed so as to secure optical paths of laser light L emitted from the plurality of light emitting elements 220.

Also in the present embodiment, light separating section 330 has a plurality of separating units 335. Also in the present embodiment, separating units 335 are disposed so that 4 to 6 separating units 335 exist within a region where the light reflected at reflecting surface 320 is incident. Further, the height of separating units falls within a range of 13 to 21 μm.

(Effects)

As described above, in addition to the effect of Embodiment 1, optical module 500 according to Embodiment 2 allows for multi-channel optical communication along with monitoring.

It should be noted, though not particularly illustrated, also in Embodiment 2, first optical surface 310, second optical surface 340 and third optical surface 350 may be planes as with Embodiment 1.

Further, in optical receptacles 300 and 600 in the above-described embodiments, it is also possible to form a reflective coating such as a thin film of a metal (for example, Al, Ag and Au) having high optical reflectivity on reflecting surface 320 and splitting reflecting surfaces 331. If reduction in the number of parts is prioritized, it is preferable to employ a configuration which utilizes only total reflection as in Embodiments 1 and 2.

INDUSTRIAL APPLICABILITY

The optical receptacle and the optical module according to the present invention are useful in optical communication using optical fibers.

REFERENCE SIGNS LIST 100, 500 Optical module
200, 700 Optoelectric converting device
210 Semiconductor substrate
220 Light emitting element
230 Light receiving element
240 Control section
300, 600 Optical receptacle
310 First optical surface
320 Reflecting surface
330 Light separating section
331 Splitting reflecting surface
332 Splitting transmissive surface
333 Splitting stepped surface
335 Separating unit
340 Second optical surface
350 Third optical surface
360 First recess
370 Second recess
380 Third recess
381 Incidence surface
390 Optical fiber mounting section
391 Fourth recess
392 Fifth recess
400 Optical fiber
410 End face
420 Ferrule
610 Connector
L Light emitted from light emitting element
Lm Monitor light
Ls Signal light
S Virtual plane

The invention claimed is:

1. An optical receptacle disposed between an optoelectric converting device and an optical fiber, the optoelectric converting device having a light emitting element and a light receiving element for monitoring light emitted from the light emitting element disposed on a substrate, the optical receptacle optically coupling the light emitting element and an end face of the optical fiber, the optical receptacle comprising:

a first optical surface which receives the light emitted from the light emitting element;
a reflecting surface which reflects light incident from the first optical surface in a direction along the substrate;
a recess which has an emitting region for emitting part of the light reflected at the reflecting surface and an incidence surface for receiving incidence of the light emitted from the emitting region;
a light separating section which is disposed in the emitting region, separates the light reflected at the reflecting surface into monitor light directed to the light receiving element and signal light directed to the end face of the optical fiber, and reflects the monitor light toward the light receiving element while emitting the signal light to the recess;
a second optical surface which emits the monitor light separated at the light separating section toward the light receiving element; and
a third optical surface which emits the signal light, which has been emitted from the light separating section and has passed through the incidence surface, toward the end face of the optical fiber, wherein
the light separating section comprises a plurality of separating units each comprising a splitting reflecting surface that is an inclining surface with respect to an optical axis of the light reflected at the reflecting surface, a splitting transmissive surface that is a perpendicular surface with respect to the optical axis, and a splitting stepped surface that is a parallel surface with respect to the optical axis, the splitting reflecting surface, the splitting stepped surface and the splitting transmissive surface being arranged in a first direction that is an inclining direction of the splitting reflecting surface;
in the light separating section, the plurality of separating units are arranged in the first direction;
a plurality of the splitting reflecting surfaces are disposed on the same virtual plane and reflect part of the light reflected at the reflecting surface toward the second optical surface;
a plurality of the splitting transmissive surfaces transmit part of the light reflected at the reflecting surface to the recess;
a plurality of the splitting stepped surfaces connect the splitting reflecting surfaces and the splitting transmissive surfaces;
in the light separating section, the plurality of separating units are disposed so that 4 to 6 separating units exist within a region where the light reflected at the reflecting surface is incident; and
a height of a boundary between the splitting transmissive surface and the splitting stepped surface with respect to the virtual plane falls within a range of 13 to 21 µm.

2. The optical receptacle according to claim 1, wherein:
a smaller angle formed by each splitting transmissive surface and an adjacent splitting reflecting surface in a cross section in the first direction is 135°; and
a smaller angle formed by each splitting stepped surface and an adjacent splitting reflecting surface is 135°.

3. The optical receptacle according to claim 1, comprising a plurality of the first optical surfaces arranged in line, a plurality of the second optical surfaces arranged in line, and a plurality of the third optical surfaces arranged in line.

4. The optical receptacle according to claim 2, comprising a plurality of the first optical surfaces arranged in line, a plurality of the second optical surfaces arranged in line and a plurality of the third optical surfaces arranged in line.

5. An optical module comprising:
an optoelectric converting device having a light emitting element and a light receiving element for monitoring light emitted from the light emitting element disposed on a substrate; and
the optical receptacle according to claim 1.

6. An optical module comprising;
an optoelectric converting device having a light emitting element and a light receiving element for monitoring light emitted from the light emitting element disposed on a substrate; and
the optical receptacle according to claim 2.

7. An optical module comprising;
an optoelectric converting device having a light emitting element and a light receiving element for monitoring light emitted from the light emitting element disposed on a substrate; and
the optical receptacle according to claim 3.

8. An optical module comprising:
an optoelectric converting having a light emitting element and a light receiving element for monitoring light emitted from the light emitting element disposed on a substrate; and
the optical receptacle according to claim 4.

9. The optical module according to claim 5, wherein
the optoelectric converting device has a plurality of the light emitting elements arranged in line and a plurality of the light receiving elements arranged in line so as to be parallel to the line of the light emitting elements, and
the optical receptacle has a plurality of the first optical surfaces arranged in line so as to correspond to the line of the light emitting elements, a plurality of the second optical surfaces arranged in line so as to correspond to the line of the light receiving elements, and a plurality of the third optical surfaces arranged in line.

10. The optical module according to claim 6, wherein
the optoelectric converting device has a plurality of the light emitting elements arranged in line, and a plurality of the light receiving elements arranged in line so as to be parallel to the line of the light emitting elements, and
the optical receptacle has a plurality of the first optical surfaces arranged in line so as to correspond to the line of the light emitting elements, a plurality of the second optical surfaces arranged in line so as to correspond to the line of the light receiving elements, and a plurality of the third optical surfaces arranged in line.

11. The optical module according to claim 7, wherein
the optoelectric converting device has a plurality of the light emitting elements arranged in line, and a plurality of the light receiving elements arranged in line so as to be parallel to the line of the light emitting elements, and
the optical receptacle has a plurality of the first optical surfaces arranged in line so as to correspond to the line of the light emitting elements, a plurality of the second optical surfaces arranged in line so as to correspond to the line of the light receiving elements, and a plurality of the third optical surfaces arranged in line.

12. The optical module according to claim 8, wherein
the optoelectric converting device has a plurality of the light emitting elements arranged in line, and a plurality of the light receiving elements arranged in line so as to be parallel to the line of the light emitting elements, and
the optical receptacle has a plurality of the first optical surfaces arranged in line so as to correspond to the line of the light emitting elements, a plurality of the second optical surfaces arranged in line so as to correspond to the line of the light receiving elements, and a plurality of the third optical surfaces arranged in line.

\* \* \* \* \*